2,947,173

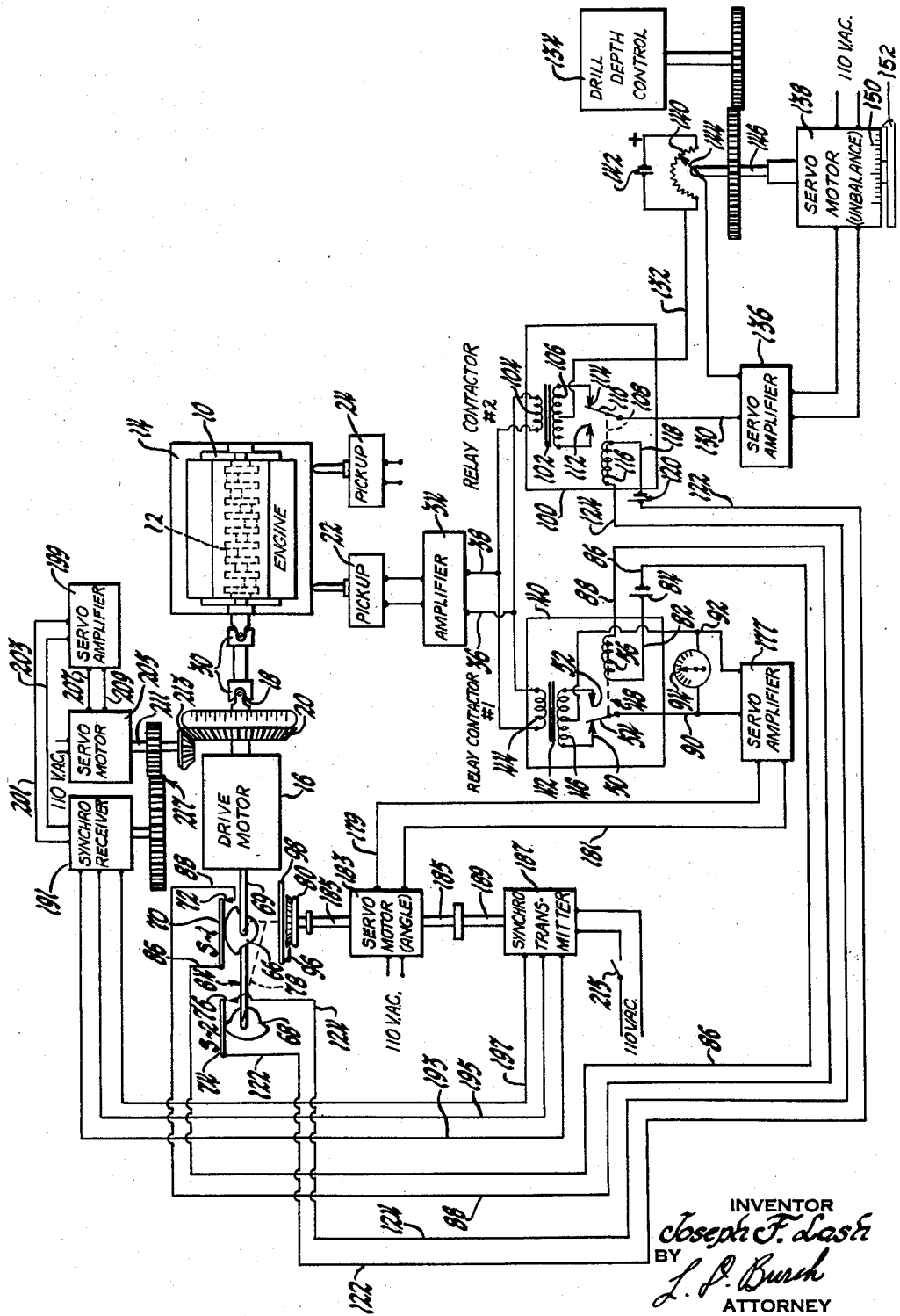

AUTOMATIC BALANCING INSTALLATION

Joseph F. Lash, Ferndale, Mich., assignor to General Motors Corporation, Detroit, Mich., a corporation of Delaware Filed Nov. 19, 1954, Ser. No. 469,893

12 Claims. (Cl. 73—464)

This invention is an improvement over copending application S.N. 684,248 filed September 16, 1957, which is a continuation of application S.N. 458,172, Balancing Organization, filed September 24, 1954, now abandoned. It relates to dynamic balancing installations of a type particularly adapted for effecting automatic unbalance determinations and balance corrections in elongated rotating workpieces such as crankshafts and the like. The invention is specially suited for use in engine assembly or finish balancing installations in which the crankshaft is automatically checked for unbalance when installed in an engine and any unbalance in the shaft, as well as such unbalance as may be contributed thereto by the other components of the engine associated with the shaft, automatically corrected in the assembled condition of the engine.

The invention has among its general objects to provide such apparatus in accordance with the above which is characterized by extreme simplicity of construction and of operation and, yet, is possessed of sufficient sensitivity and accuracy required for high production balancing installations.

Other objects are to provide dynamic unbalance determining apparatus adapted to provide fully automatic determinations of both the magnitude or amount of unbalance and the angle or location of unbalance without requiring an operator to adjust dials, read instruments and interpret readings.

Still other objects are to provide such automatically operated unbalance determining apparatus which is adapted to be intimately associated with unbalance correcting apparatus that is automatically adjusted during the determination of the characteristics of unbalance on a workpiece for effecting subsequent balance corrections thereto without human intervention.

The above and other objects, together with the features and advantages attending the present invention will appear more fully from the following detailed description and drawing which is a schematic and block diagrammatic showing of an automatic dynamic balancing installation comprising a fully automatic dynamic unbalance determining apparatus and associated balance correcting apparatus in accordance with the present invention.

In the drawing, 10 is an engine assembly having a crankshaft 12 therein and mounted with the oil pan cover removed in an oscillatable engine stand or cradle 14. 16 is a constant speed electric drive motor, the shaft 18 of which mounts an angularly graduated hand wheel 20 thereon and is suitably coupled to the engine crankshaft 12 to rotate the latter on its axis in the cradle or stand. 22 and 24 are vibration pickups each of which is associated with an unbalance magnitude and location determining apparatus and an element of an unbalance magnitude correcting device in accordance with the present invention. Only one set of the unbalance determining apparatus and the element of an unbalance magnitude correcting device for one of the pickups is shown in the drawing, which is for the most part of a diagrammatic nature to bring out principles of operation rather than particular details of construction.

The engine stand or cradle 14 is of a type employed in conventional balancing installations and is mounted on resilient or oscillatable supports that permit movement of the cradle and engine due to unbalance effects in either end of the crankshaft in an axial plane of the shaft and the vibration pickups. In accordance with conventional balancing practice, the crankshaft is coupled to the shaft 18 of the drive motor through a suitable coupling arrangement shown at 30, which may comprise a pair of spaced universal joints that permit free oscillation of the shaft under the influence of unbalance forces therein.

The vibration pickups 22 and 24 are mounted transversely to the axis of the shaft and at axially spaced points along the length of the cradle corresponding to the mechanical nodal points of the unbalance forces at the respective ends of the crankshaft in accordance with the theory and practice set out in United States Patent 2,293,371 in the name of T. C. Van Degrift assigned to the present assignee. The pickups are conventional electromagnetic devices each of which generates an alternating current signal proportional to the velocity of the oscillatory vibrations appearing at the respective ones of the aforementioned nodal points, and, by reason of the nodal point mounting thereof, are unaffected by the unbalance influence of the opposite end of the shaft. The alternating current signal from each of the pickup devices has a frequency equal to the rotational speed at which the crankshaft is driven and an amplitude proportional to the total unbalance effect produced by the end of the shaft adjacent the pickup. Each pickup signal further includes a phase displacement characteristic that is related to the angular location of the total unbalance from a fixed reference point on the surface of the shaft and contained in a transaxial correction plane extending through an end counterweight of the shaft, there being two such correction planes, one at each end of the shaft.

Pickup 22, together with the apparatus associated therewith, is adapted, therefore, to sense the characteristics of unbalance at the left end of the shaft and has its output amplified in an amplifier 34 the output of which is applied over conductors 36, 38 to a first chopper or unbalance angle relay contactor device 40. The device 40 includes a transformer 42 having a primary winding 44 connected to conductors 36, 38 and a center-tapped secondary winding 46 associated with a relay contact 48 having a pair of stationary contacts 50, 52 and a movable switch arm 54 operable between said contacts by an energizable relay coil 56.

Relay coil 56 is interconnected with reference pickup means such as switches S–1 and S–2 which are effective to energize the coil in response to the angular position of the crankshaft 12. These switches S–1 and S–2 are in circuits which are periodically and alternately completed and interrupted by the contact mechanisms in the circuit interrupting switches S–1 and S–2 and indicated generally at 64. Contact mechanism 64 comprises a pair of rotatable axially spaced cam elements 66, 68 oriented 90 degrees in space relative to one another and mounted on a shaft 69 that is suitably coupled to the drive motor 16 and driven in synchronism with the crankshaft 12. Each cam has associated therewith a pair of circuit contacts 70, 72 and 74, 76 which are stationary and are alternately closed and opened for each revolution of the shaft 69. Suitable ganged means 78 associated with the cams and including a control knob 80 is provided for angularly displacing the cams relative to their contacts so as to alter the commencement of the half period during which the contacts 70, 72 and 74, 76 are closed and opened relative to a fixed reference point on the crankshaft.

The energizing circuit for relay coil 56 includes conductor 82, a source of power such as battery 84, conductor 86, contacts 70, 72 and conductor 88. The movable switch arm 54 of the relay 48 thus is alternately moved between its contacts 50, 52 to provide a reversing or commutating action of the amplified pickup signal. This commutated signal appears in the output of the unbalance angle relay contactor device 40 between conductors 90 and 92, which are connected to switch arm 54 and the center tap of the transformer secondary winding, respectively, and may be displayed on a zero center D.C. milliammeter 94 connected between conductors 90 and 92. Rotation of the control knob 80 to adjust the position of the cams 66 and 68 with respect to the crankshaft will cause the amplitude of the full wave rectified signal displayed on meter 94 to vary between a maximum negative and a maximum positive reading. The control knob 80 is provided with angular graduations thereon so that its angular displacement relative to a reference pointer 96 on a stationary panel or the frame 98 of the contact mechanism 64 may be read for a zero or null reading of meter 94 as an indication of the angular location of the unbalance in the left end of the crankshaft. While the knob 80 may be adjusted by an operator to effect a null reading of the meter as in an open loop step sequence system, the present invention comprehends automatic positioning of the contact mechanism, as will be brought out later herein.

The amplitude or magnitude of the total unbalance at the left end of the shaft is determined by applying the amplified pickup signal appearing at the output of amplifier 34 to a second chopper or unbalance amplitude relay contactor device 100 which is similar to chopper 40 and includes a transformer 102 having a primary winding 104 and a center tapped secondary winding 106 and a relay contactor 108 with a switch arm 110 movable between a pair of stationary contacts 112 and 114 by an energizable actuating coil 116. Actuating coil 116 is connected in an energizable circuit which includes conductor 118, battery 120, conductor 122, contacts 74, 76 of contact mechanism 64 and conductor 124.

The commutated output of the second chopper 100 is taken from the center tapped secondary winding 106 and switch arm 110 and applied as a full wave rectified signal over conductors 130, 132 to a closed loop servo controlled amplitude comparison circuit which automatically indicates the magnitude of the unbalance quantity and positions an adjustable drill stop setting element 134 of a balance correction drilling organization associated with the unbalance determining apparatus to effect exact compensation for the amount of the unbalance at the left end of the shaft. The amplitude comparison and drill stop positioning apparatus includes a conventional servo amplifier 136 and its associated two-phase servo positioning motor 138 and a potentiometer arrangement comprising the adjustable resistor 140 connected across a fixed, known reference source of balance voltage, shown as battery 142. The output of the second chopper 100 is connected in series with the input of the servo amplifier and the portion of the output of the potentiometer appearing between conductor 132 and the adjustable arm 144 of the potentiometer resistor 140, which is mechanically coupled to the shaft 146 of the servo motor 138.

One of the phase windings of the servo motor 138 is connected for energization from a local alternating current source of supply and the other quadrature phase winding thereof connected for energization by a control signal, which appears at the output of the servo amplifier 136 and corresponds to the amplitude difference between the output of the chopper and the potentiometer. The resulting differential control signal is of such magnitude and polarity as to tend to rotate the unbalance servo motor 138 in a direction and an amount such as to reduce the error or control signal to zero, at which point the amplitude comparison system will be balanced and the motor or translating device will cease moving.

An indicating arrangement in the form of a graduated indicator dial 150, which may be provided on, say, the stator casing of the servo motor 138, and a pointer 152 carried by the shaft 146 may be employed to indicate the magnitude of the unbalance. The shaft 146 of the unbalance servo motor 138 is directly coupled to the drill depth control element 134 of a balance correcting drilling organization or equivalent balance correcting apparatus, which is mounted under the engine assembly, and adjusts the drill depth setting element automatically in accordance with the determination of the magnitude or amount of unbalance. It will be noted that both the unbalance magnitude determination and the setting of the drill stop element are performed automatically without human intervention.

To provide for automatic adjustment of the knob 80 of the contact mechanism 64, the output of the first or unbalance angle relay contactor 40 is applied to the input of a servo amplifier 177 of a servo positioning system, thereby dispensing with this previously manually performed operation. The output of the servo amplifier 177 is connected over conductors 179 and 181 to the variably energized phase windings of an angle positioning servo motor 183 whose rotor shaft 185 is geared to the rotatable housing or knob 80 of the contact mechanism 64.

The apparatus may further include still another servo positioning arrangement for angularly positioning the handwheel 20 upon conclusion of the unbalance determining operation to correspond to the extent of rotation of the unbalance angle servo motor 183 when the relay contactor 40 was adjusted to balance, and thereby to locate the crankshaft in proper relation to the balance correcting apparatus. This last-mentioned crankshaft positioning arrangement may include a synchro transmitter device 187, the rotor shaft 189 of which is coupled to the shaft 185 of the servo motor 183; a synchro receiver device 191 the three-phase stator winding of which is electrically connected to the three-phase stator winding of the transmitter device 187 over conductors 193, 195, 197; a servo-amplifier 199 the input terminals of which are connected to the rotor winding of the receiver synchro device 191 over conductors 201 and 203; and a two-phase power servo positioning motor 205 the control phase winding of which is connected to the output of the servo amplifier 199 over conductors 207 and 209. The other winding of the servo motor 205 is energized from a local alternating current power source. The rotor shaft 211 of this servo positioning motor is coupled through suitable gearing 213 to the wheel 20 or to the crankshaft itself and through gearing 217 to the shaft of the synchro receiver in the manner of synchro-controlled servo positioning arrangements. A switch 215 may be provided in one of the A.C. source conductors of the position transmitter device 187 and is adapted to be closed to energize this data transmission system at the conclusion of the unbalance determining cycle when the drive motor 16 stops rotating, at which time the control phase winding of the servo motor 205 will be energized to servo position the wheel 20 in accordance with the determined angle of unbalance location for the left end of the shaft.

The two cams 66 and 68 of the contact mechanism 64 both move as the servo motor 183 automatically adjusts the control knob 80 or housing of the contact mechanism 64 for zero or null reading on the D.C. meter 94. The output of chopper 40 associated with unbalance location or angle determining portion of the apparatus is then zero while that of chopper 100 associated with the quadrature related cam 68 of the unbalance magnitude determining portion of the apparatus will be a maximum. The unbalance servo motor 138 controlled from the unbalance magnitude relay contactor 100 adjusts the drill stop element 134, and after the drive motor has been stopped, the synchro data transfer system 187, 191 is energized to control motor 205 which adjusts the hand wheel 20 to position the exposed counterweight of the crankshaft where one of the balance corrections is to be performed over the drill bit of the drilling organization mounted below the engine stand and thereafter energizes the drill motor and transmission apparatus thereof to remove an amount of metal corresponding to the setting of the automatically adjusted drill depth setting element from the counterweight in the left end correction plane. The operation is repeated for the right end of the shaft with similar apparatus associated with pickup 24.

The use of the chopper-rectifying apparatus for the unbalance magnitude and angle computing apparatus simplifies difficult filtering problems that otherwise would be presented and assures that the unbalance signal obtained from the outputs of the choppers will be unaffected by and will be independent of all frequencies other than the fundamental frequency determined by the speed of spindle 69. In short, the choppers act as very narrow band pass filters.

Pickup 24 is adapted to sense unbalance effects in the right end of the crankshaft and will have its output applied to an unbalance determining and drill depth control apparatus including a second contact mechanism and second set of angle location and unbalance magnitude choppers and associated positioning apparatus identical with that associated with pickup 22, the complete illustration of which has been omitted for simplicity of the drawing.

While the present invention has been shown and described herein as applied to the unbalance detection and correction of unbalance in two arbitrarily selected transaxial planes of correction in elongated bodies such as crankshafts, it is apparent that the principles and apparatus of the present invention are equally adapted to automatic detection and correction of unbalance in bodies in which the unbalance is located in but a single transaxial plane.

What is claimed is:

1. Apparatus for automatically determining the location of unbalance of a dynamically unbalanced rotating body comprising in combination vibration pickup means responsive to vibrations induced by unbalance in said body and developing a periodically varying signal having characteristics related to the location of unbalance in said body; a chopper device having an input circuit connected to said vibration pickup means and an output circuit with a commutator therein; a variable contact mechanism controlling the output from said chopper device and including a cam driven in synchronism with said body, a pair of switch contacts adapted to be actuated by said cam and adjustable means for changing the position in space of said switch contacts relative to said cam, said switch contacts being connected in circuit controlling relation with said commutator; and servo positioning means connected to said commutator to be responsive to the output of said chopper device for automatically adjusting said adjustable means of said variable contact mechanism so that the output from said chopper device will be some predetermined amount.

2. Apparatus for automatically determining the location of unbalance of a dynamically unbalanced body comprising in combination, oscillatable means supporting the body for rotation about its axis; drive means including a rotatable shaft coupled to said body for rotating the latter on its axis; vibration pickup means responsive to vibrations induced in said oscillatable supporting means by unbalance in said body and actuable by said supporting means, said pickup means developing a periodically varying signal having characteristics related to the location of unbalance in said body; a commutating chopper device including a transformer having a primary winding connected to said vibration pickup means and a center-tapped secondary winding, a relay having a pair of stationary contacts connected to the opposite ends of said secondary winding and an armature movable between said contacts by an operating coil of the relay; a variable contact mechanism including a cam driven by said drive means in synchronism with said body, a pair of switch contacts adapted to be actuated by said cam and adjustable means for changing the position in space of said switch contacts relative to said cam, said switch contacts being connected in an energizing circuit for said relay operating coil; and servo positioning means connected to receive the output of said chopper device constituted by the relay armature and center-tap of said transformer secondary winding for automatically actuating said adjustable means of said variable contact mechanism so that said output will be some predetermined amount.

3. The combination in accordance with claim 2 above wherein said servo positioning means includes a servo motor having a control winding coupled to said relay armature and the center tap of the transformer secondary winding and a rotor mechanically coupled to adjust said adjustable means of said variable contact mechanism.

4. The combination in accordance with claim 2 above wherein said servo positioning means includes a servo motor having a control winding coupled to said relay armature and the center tap of the transformer secondary winding and a rotor mechanically coupled to adjust said adjustable means of said variable contact mechanism; and a data transmission system including a synchronous transmitter element coupled to the rotor of said servo motor, a synchronous receiver element, and a second servo motor having a control winding energized from said synchronous receiver element and a rotor coupled to said shaft of said drive means and to said receiver element, and means energizing said data transfer system when said drive means stops rotating.

5. Apparatus for automatically determining the magnitude and location of unbalance of a dynamically unbalanced body comprising in combination, oscillatable means supporting the body for rotation about its axis; drive means including a rotatable shaft coupled to said body for rotating the latter on its axis; vibration pickup means responsive to vibrations induced in said oscillatable supporting means by unbalance in said body and developing a periodically varying signal having amplitude and phase characteristics related to the magnitude and location of unbalance in said body; a pair of commutating chopper devices each including a transformer having a primary winding connected to said vibration pickup and a center-tapped secondary winding, a relay having a pair of stationary contacts connected to the opposite ends of said secondary winding and an armature movable between said contacts by an operating coil of the relay; a variable contact mechanism including a pair of cams displaced 90 degrees apart and driven by said drive means in synchronism with said body, a pair of switches each having a pair of switch contacts adapted to be actuated by one of said cams and adjustable means for changing the position in space of said switches relative to said cams, said switch contacts of each of said switches being connected in an energizing circuit for the relay operating coil of a different one of said chopper devices; a servo positioning means for automatically adjusting said adjustable means of said variable contact mechanism and connected to receive the output of one of said chopper devices constituted by the relay armature and center-tap of the transformer secondary winding thereof so as to change the relative position of said switches and cams until the output of said chopper device is substantially zero; and a self-balancing type amplitude comparison circuit connected to the output of the other of said chopper devices.

6. The combination in accordance with claim 5 wherein said shelf-balancing type amplitude comparison circuit includes an adjustable known source of balancing potential and a servo motor, which is actuated by the difference signal between the commutated output of the other of said chopper devices and said adjustable known source of balancing potential and is operatively connected to adjust the latter to reduce the said difference signal to zero.

7. The combination in accordance with claim 5 which includes an adjustable stop element positioned by said servo motor in the course of balancing said self-balancing amplitude comparison circuit.

8. The combination in accordance with claim 5 wherein said servo positioning means includes a servo motor having a control winding coupled to said relay armature and the center-tap of the transformer secondary winding of one of said chopper devices and a rotor mechanically coupled to adjust said adjustable means of said variable contact mechanism.

9. The combination in accordance with claim 5 above wherein said servo positioning means includes a first servo motor having a control winding coupled to said relay armature and the center-tap of the transformer secondary winding of one of said chopper devices and a rotor mechanically coupled to adjust said adjustable means of said variable contact mechanism and wherein said self-balancing amplitude comparison circuit includes an adjustable known source of balancing potential and a second servo motor that is actuated by the difference signal between the commutated output of the other of said chopper devices and said adjustable known source of balancing potential and is operatively connected to adjust the latter to reduce said difference signal to zero.

10. Apparatus for automatically determining the magnitude and location of unbalance of a dynamically unbalanced rotatable body comprising vibration pickup means responsive to vibrations induced by unbalance in said body, said pickup means developing a periodically varying signal having amplitude and phase characteristics related to the magnitude and location of unbalance in said body; a pair of commutating chopper devices each including a transformer having a primary winding connected to said vibration pickup and a center-tapped secondary winding, a relay having a pair of stationary contacts connected to the opposite ends of said secondary winding and an armature movable between said contacts by an operating coil of the relay; a variable contact mechanism including a pair of switches each having a pair of switch contacts, cam means driven in synchronism with said body and disposed with respect to said switches to actuate the closing of the respective contacts thereof 90 degrees in time phase apart, and adjustable means for changing position in space of said switches relative to said cam means, the said switch contacts of each of said switches being connected in an energizing circuit for the relay operating coil of a different one of said chopper devices; a servo positioning means operatively interconnected with said adjustable means of said variable contact mechanism and connected to receive the output of one of said chopper devices constituted by the relay armature and center-tap of the transformer secondary winding thereof for automatically adjusting the relative position of said switches and cam means until said output is a minimum; and a self-balancing type amplitude comparison circuit connected to the output of the other of said chopper devices.

11. An apparatus for determining the unbalance in a rotating workpiece comprising a pickup responsive to vibrations in said workpiece for creating an unbalance signal indicative of the unbalance in said workpiece, reference means for simultaneously creating a pair of 90° angularly disposed components bearing a known but adjustable phase relation to said workpiece, second means interconnected with said reference means for adjusting said phase relation, a circuit interconnected with said reference means and including a pair of separate rectifier portions responsive to said components, each of said portions being effective to rectify said unbalance signal in response to one of said components to produce a pair of separate electrical output signals, servo mechanism operatively interconnected with said second means and being responsive to one of said electrical output signals for automatically controlling said phase relation between said workpiece and said reference means so that said last mentioned output signal will be reduced to a minimum and means for indicating the amount of the other of said output signals.

12. The combination of claim 11 wherein said servo mechanism also includes means for repositioning said workpiece when it is not rotating to correspond to the adjusted position of said reference means.

References Cited in the file of this patent

UNITED STATES PATENTS

| | | |
|---|---|---|
| 1,822,075 | Aronoff | Sept. 8, 1931 |
| 2,131,602 | Thearle | Sept. 27, 1938 |
| 2,177,830 | Janeway | Oct. 31, 1939 |
| 2,196,039 | Thearle | Apr. 2, 1940 |
| 2,243,379 | Johnson | May 27, 1941 |
| 2,678,558 | Pischel | May 18, 1954 |
| 2,731,835 | Hellar et al. | Jan. 24, 1956 |
| 2,779,217 | Stovall et al. | Jan. 29, 1957 |
| 2,783,649 | Hope | Mar. 5, 1957 |